US009612739B2

(12) United States Patent
Large et al.

(10) Patent No.: US 9,612,739 B2
(45) Date of Patent: Apr. 4, 2017

(54) LOW-LATENCY TOUCH-INPUT DEVICE

(75) Inventors: Timothy Andrew Large, Bellevue, WA (US); Steven Nabil Bathiche, Kirkland, WA (US); Paul Henry Dietz, Redmond, WA (US); Bernard K. Rihn, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 13/365,169

(22) Filed: Feb. 2, 2012

(65) Prior Publication Data
US 2013/0201112 A1 Aug. 8, 2013

(51) Int. Cl.
*G06F 3/041* (2006.01)
*G06F 3/0488* (2013.01)

(52) U.S. Cl.
CPC .......... *G06F 3/04883* (2013.01); *G06F 3/041* (2013.01)

(58) Field of Classification Search
CPC ..................... G09G 3/3614; G09G 3/3648
USPC ..................... 345/173-179; 178/18.01-19.07
See application file for complete search history.

(56) References Cited

U.S. PATENT DOCUMENTS

| 5,565,632 | A | 10/1996 | Ogawa |
| 5,905,488 | A | 5/1999 | Demers et al. |
| 6,310,614 | B1 | 10/2001 | Maeda et al. |
| 2002/0011990 | A1 | 1/2002 | Anwar |
| 2003/0146906 | A1 | 8/2003 | Lin |
| 2003/0156099 | A1* | 8/2003 | Yrjanainen et al. ......... 345/173 |
| 2004/0196255 | A1 | 10/2004 | Cheng |
| 2006/0279810 | A1 | 12/2006 | Momose et al. |
| 2008/0309636 | A1 | 12/2008 | Feng et al. |
| 2009/0036176 | A1 | 2/2009 | Ure |
| 2009/0189875 | A1 | 7/2009 | Ma |
| 2010/0020044 | A1 | 1/2010 | Abileah et al. |
| 2010/0020103 | A1* | 1/2010 | Ure ....................... G06F 1/1624 345/660 |
| 2010/0149209 | A1* | 6/2010 | Nose ............................ 345/618 |
| 2010/0182285 | A1 | 7/2010 | Tremblay |

(Continued)

FOREIGN PATENT DOCUMENTS

| CN | 1851549 | 10/2006 |
| JP | 2008197634 | 8/2008 |

(Continued)

OTHER PUBLICATIONS

Ramos, et al., "Pressure Widgets", Retrieved at <<http://www.dgp.utoronto.ca/~ravin/papers/chi2004_pressurewidgets.pdf>>, Apr. 24-29, 2004, pp. 487-494.

(Continued)

*Primary Examiner* — Michael Pervan
*Assistant Examiner* — Andrew Lee

(57) ABSTRACT

This document describes embodiments of a low-latency touch-input device. The low-latency touch-input device receives writing as input to the device and temporarily displays the writing on a physical layer that overlays a touchscreen display of the device. The writing is displayed instantaneously on the physical layer before the touch-input device processes the input. The low-latency touch-input device then processes the input to generate a digital representation of the writing and renders the digital representation of the writing on the touchscreen display to replace the writing displayed on the physical layer.

20 Claims, 5 Drawing Sheets

(56) References Cited

U.S. PATENT DOCUMENTS

| | | | |
|---|---|---|---|
| 2010/0245291 A1* | 9/2010 | Harada et al. | 345/175 |
| 2010/0265214 A1* | 10/2010 | Green et al. | 345/174 |
| 2011/0018840 A1* | 1/2011 | Fann et al. | 345/174 |
| 2011/0273380 A1 | 11/2011 | Martin | |
| 2012/0280948 A1* | 11/2012 | Barrus et al. | 345/179 |

FOREIGN PATENT DOCUMENTS

| | | |
|---|---|---|
| JP | 2012234538 | 11/2012 |
| KR | 10-2001-0094772 A | 11/2001 |

OTHER PUBLICATIONS

"International Search Report", Mail Date: May 10, 2013, Application No. PCT/US2013/022614, Filed date: Jan. 23, 2013, pp. 12.
"Extended European Search Report", EP Application No. 13744225.7, Aug. 7, 2015, 8 pages.
"Foreign Office Action", CN Application No. 201380007495.4, May 3, 2016, 13 pages.
"Foreign Notice of Allowance", CN Application No. 201380007495.4, Nov. 1, 2016, 4 pages.
"Foreign Office Action", JP Application No. 2014-555577, Nov. 1, 2016, 9 pages.

\* cited by examiner

LOW-LATENCY TOUCH-INPUT DEVICE

BACKGROUND

A conventional touch-input device, such as a tablet device or a credit-card signature device, is equipped with a touchscreen display. The touchscreen display enables a user to write using a writing tool, such as a stylus, an electronic pen, or the user's finger. Typical touch-input devices, however, have a latency of approximately 100 ms. Latency is the delay between writing being received via the touchscreen display and the digital representation of the writing being rendered on the touchscreen display. For low-speed display devices, such as electrophoretics, this delay may be even longer. This latency makes it difficult to write on the touch-input device because the digital representation being rendered on the touchscreen display is not directly linked to the instantaneous position of the writing tool.

SUMMARY

This document describes embodiments of a low-latency touch-input device. The low-latency touch-input device receives writing as input to the device and temporarily displays the writing on a physical layer that overlays a touchscreen display of the device. The writing is displayed instantaneously on the physical layer before the touch-input device processes the input. The low-latency touch-input device then processes the input to generate a digital representation of the writing and renders the digital representation of the writing on the touchscreen display to replace the writing displayed on the physical layer.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of a low-latency touch-input device are described with reference to the following drawings. The same numbers are used throughout the drawings to reference like features and components.

DETAILED DESCRIPTION

Overview

A conventional touch-input device, such as a tablet device or a credit-card signature device, is equipped with a touchscreen display that enables a user to write using a writing tool, such as a stylus, an electronic pen, or the user's finger. For example, a tablet device can be used by a user to take handwritten notes. Similarly, a credit-card signature device can be used to receive a user's signature after the user makes a purchase using a credit card.

Typical touch-input devices, however, have a latency or delay between writing being received via the touchscreen display and the digital representation of the writing being rendered on the touchscreen display. For low-speed display devices, such as electrophoretics, this delay may be even longer. This delay causes the digital representation of the writing to appear behind the user's movements, which breaks the feedback loop in the user's brain that coordinates movement of the hand with the digital representation of the writing being rendered on the touchscreen display. The effect is similar to delayed auditory feedback, which is widely known to cause stammering. The delay is normally an accumulation of small time delays in sub-components including sensor processors, internal busses, core processors, display buffers, and the time taken to physically write on the touchscreen display. Thus, the delay makes it difficult to write on touchscreen displays of conventional touch-input devices.

This document describes a low-latency touch-input device that reduces or eliminates the effects of latency. The low-latency touch-input device receives writing as input to the device when a writing tool writes on a physical layer that overlays a touchscreen display of the device. The physical layer temporarily and instantaneously displays the writing, as the writing is received, before the touch-input device processes the input. In some embodiments, the physical layer can display the writing less than 50 milliseconds after the writing is received. By displaying the writing instantaneously, the feedback loop in the user's brain, which coordinates movement of the user's hand with the representation of the writing on the display, is not broken. The low-latency touch-input device then processes the input to generate a digital representation of the writing and renders the digital representation of the writing on the touchscreen display to replace the writing displayed on the physical layer.

Example Environment

Figure 1:
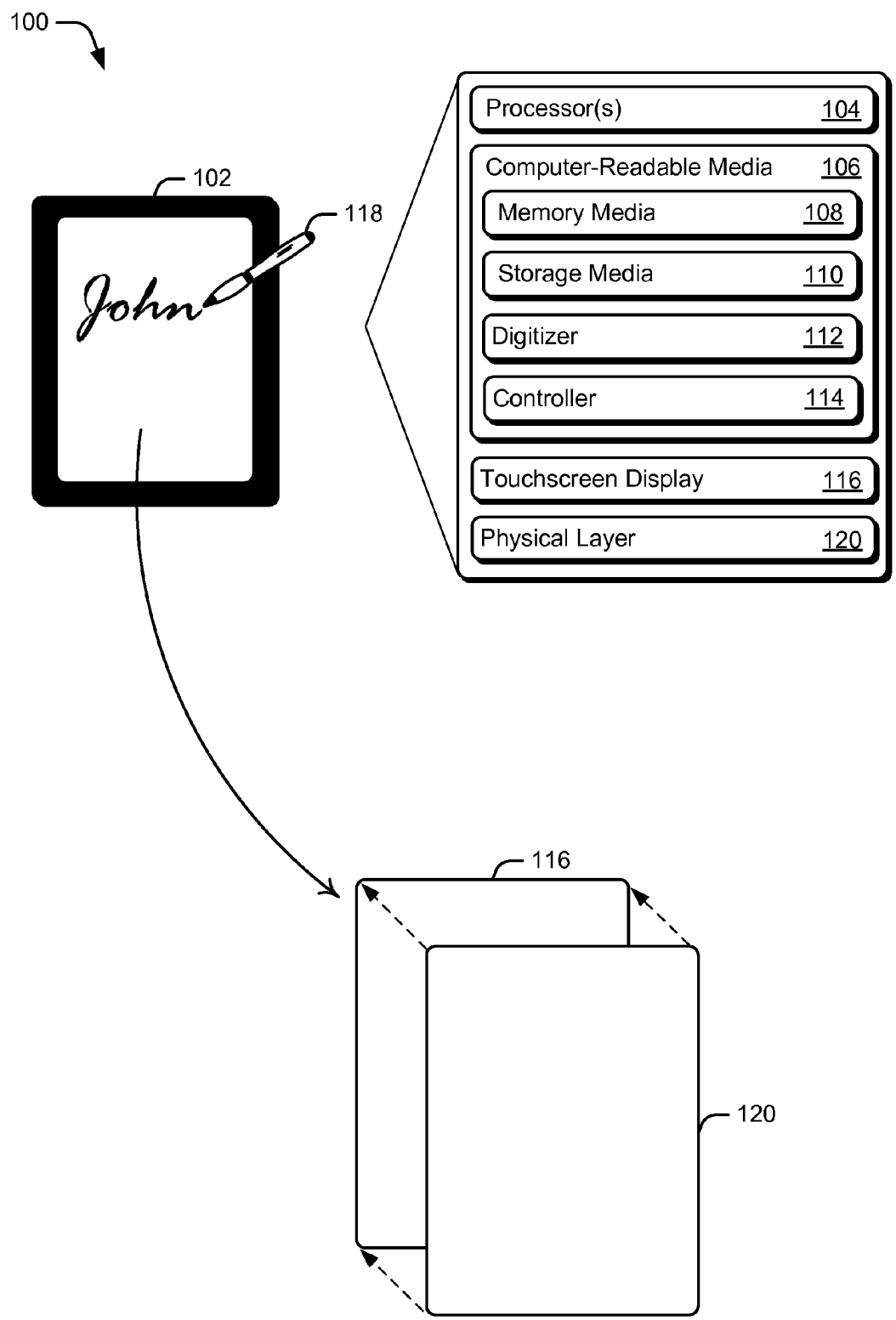
FIG. 1 illustrates an example environment in which a low-latency touch-input device can be implemented.

FIG. 1 is an illustration of an example environment 100 in which a low-latency touch-input device can be implemented. Environment 100 includes a low-latency touch-input device 102 (touch-input device), which is illustrated in this example as a tablet device. It is to be appreciated, however, that touch-input device 102 may be implemented as any device that is configured to receive input via a touchscreen display, including by way of example and not limitation, as one of a credit-card signature device, a smart phone, a laptop computer, a television device, or a desktop computer.

Low-latency touch-input device 102 includes processor(s) 104 and computer-readable media 106, which includes memory media 108 and storage media 110. Applications and/or an operating system (not shown) embodied as computer-readable instructions on computer-readable media 106 can be executed by processor(s) 104 to provide some or all of the functionalities described herein. Computer-readable media also includes a digitizer 112 for converting writing received by touch-input device 102 into a digital representation of the writing, and a controller 114. How controller 114 is implemented and used varies, and is described as part of the methods discussed below.

Touch-input device 102 also includes a touchscreen display 116, which is configured to receive writing as input when a user writes on touch-input device 102 using a writing tool 118 and to display a digital representation of the writing. As described herein, the term "writing tool" refers to any tool that is capable of writing on touchscreen display 116, including by way of example and not limitation, a stylus, an electronic pen, a light pen equipped with a light source, or a user's finger. In some embodiments, touch-input device may be a pen-input device which is specifically configured to receive input via a stylus, an electronic pen, or a light pen equipped with a light source.

Touchscreen display 116 can be implemented to receive writing as input when writing tool 118 makes contact with a physical layer 120 that overlays touchscreen display 116. Touchscreen display 116 receives the input even though writing tool 118 makes contact with physical layer 120. Note, therefore, that physical layer 120 can be flexible and/or transparent to permit the writing to be received as input by touchscreen display 120. Controller 114 sends this input, which includes a location of where the writing is received on the touchscreen display, to digitizer 112, which processes or "digitizes" the input to generate a digital representation of the writing. Controller 114 then renders the digital representation of the writing on touchscreen display 116. Touchscreen display 116 may be implemented as various types of touchscreen displays, including by way of example and not limitation as one of a capacitive touchscreen display, a resistive touchscreen display, an infrared touchscreen display, or an optical touchscreen display.

In accordance with various embodiments, physical layer 120 is configured to temporarily and instantaneously display writing, when the writing is received, before touch-input device 102 is able to process and render the representation of the writing on touchscreen display 116. For example, the physical layer can display the writing less than 50 milliseconds after the writing is received. In an embodiment, physical layer 120 can be implemented as a pressure-sensitive layer that immediately displays the writing without touch-input device 102 processing the input. For example, physical layer 120 can instantaneously, or substantially instantaneously, emit or reflect light responsive to physical contact between physical layer 120 and writing tool 118. In this way, a user receives immediate feedback, without latency, when writing on touch-input device 102 making it much easier for the user to write on the touch-input device.

The writing displayed on physical layer 120 is only displayed temporarily before the writing completely decays, or is deleted, from the physical layer. Before or at the same time that the writing completely decays, or is deleted, from the physical layer, touch-input device 102 renders a digital representation of the writing on touchscreen display 116. The digital representation of the writing replaces the writing displayed on physical layer 120. It is to be noted that, in some embodiments, the writing displayed on physical layer 120 and the digital representation of the writing rendered on touchscreen display 116 are indistinguishable to a user because they occupy the same, or substantially the same, location on touch-input device 102. Furthermore, the transition between physical layer 120 displaying the writing and touchscreen display 116 displaying the digital representation of the writing can be unnoticeable to a user. Thus, in some embodiments, to the user it appears as though touch-input device 102 displays the digital representation of the writing instantaneously with the writing being received.

Touch-input device 102 may temporarily display the writing on physical layer 120 using a variety of different techniques. In one embodiment, the writing displayed on physical layer 120 decays over time. For example, the writing displayed on physical layer 120 may slowly fade over a period of time until the writing is completely gone from physical layer 120. During this decay time, touch-input device 102 can process and render the digital representation of the writing on touchscreen display 116 to replace the writing displayed on physical layer 120.

In another embodiment, physical layer 120 can be periodically refreshed, such as at a constant time interval, to delete writing displayed on the physical layer. For example, controller 114 can be implemented to refresh physical layer 120 every two seconds to delete writing from the physical layer. In one other embodiment, controller 114 can determine to delete writing from physical layer 120, and then to delete the writing from the physical layer. Controller 114 can make this determination in a variety of different ways. For example, controller 114 can determine to delete the writing from the physical layer when the user stops writing for a period of time, when a complete word is written by the user, or when the user begins writing on a new line. As another example, controller 114 can determine to delete writing from the physical layer at a time interval that is based on the amount of time it takes to process and render the digital representation of the writing on touchscreen display 116.

As another example, controller 114 can determine to delete writing from physical layer 120 responsive to a user action, such as a user turning a page of an e-book. For example, when the user writes notes on the page of the e-book, the notes can be instantaneously displayed on physical layer 120. Then, when the user navigates to a next page of the e-book, the notes can be deleted from physical layer 120. If the user later turns back to the page, a digital representation of the notes can be displayed on touchscreen display 116 to replace the notes that were previously displayed on physical layer 120. It is to be appreciated that these are just a few of the possible ways in which controller 114 can determine to delete writing from physical layer 120.

Physical layer 120 may be implemented with any type of material that can instantaneously display input, such as writing, when a writing tool makes contact with the physical layer. By way of example, and not limitation, physical layer 120 can be implemented as a pressure-sensitive cholesteric liquid crystal layer, which overlays touchscreen display 116, and temporarily displays writing when pressure from a writing tool is applied to the pressure-sensitive cholesteric liquid crystal layer. When physical layer 120 is implemented as a pressure-sensitive cholesteric liquid crystal layer, physical layer 120 can receive writing from writing tool 118 and immediately display the writing. Then, the pressure-sensitive cholesteric liquid crystal layer can be periodically refreshed electronically to delete the display of the writing, which can be replaced by the digital representation of the writing on touchscreen display 116.

As another example, physical layer 120 can be implemented as a luminous layer that is configured to instantaneously reflect light when contacted by a light source. In this example, a light pen containing a light source can be used to write on touch-input device 102 so that light emitted from the light source is immediately reflected when the light pen contacts the luminous layer. Thus, when physical layer 120 is implemented as a luminous layer, physical layer 120 can receive writing from a light pen and immediately display the writing. The writing may then decay over time to delete the display of the writing from the luminous material, which can be replaced by the digital representation of the writing on touchscreen display 116.

Figure 2A:
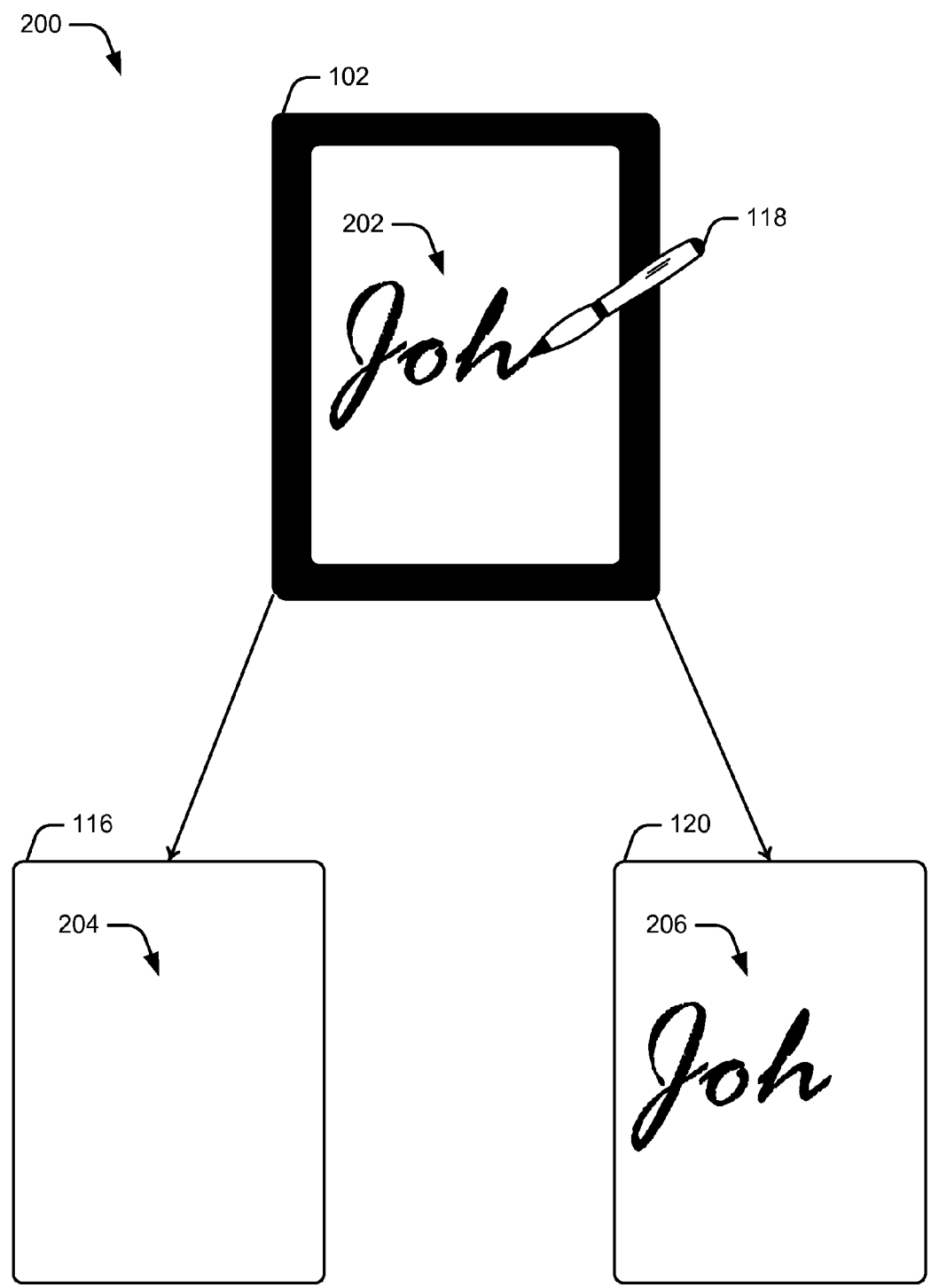
FIGS. 2*a* and 2*b* illustrate detailed examples of a low-latency touch-input device.
Figure 2B:
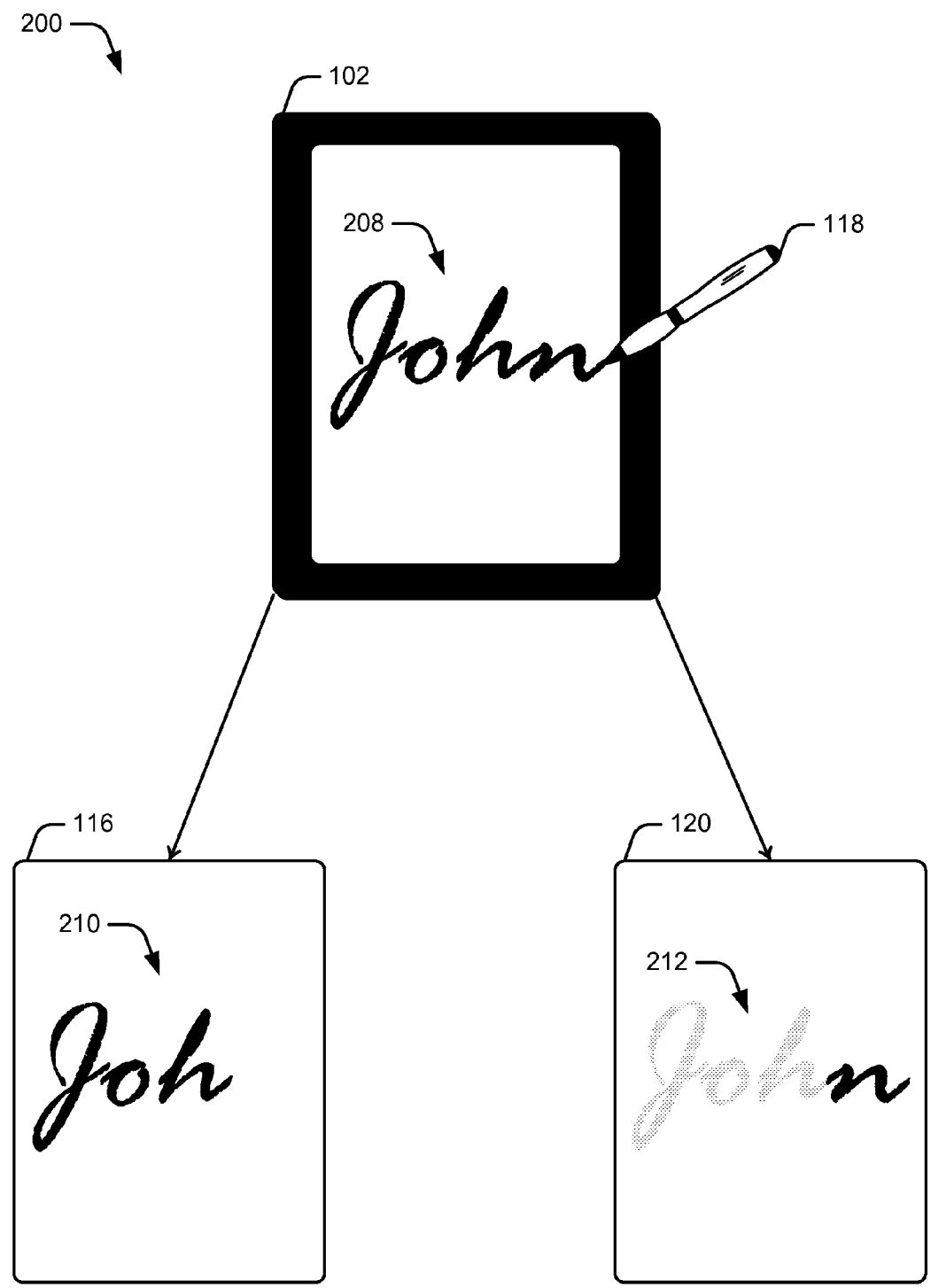

FIGS. 2a and 2b illustrate detailed examples 200 of writing on touch-input device 102. In FIG. 2a, at 202, a user writes the letters "Joh" on touch-input device 102 using writing tool 118. Touch-input device 102 instantaneously displays the letters "Joh" as the writing is received from the user. Immediately after receiving the writing, however, touchscreen display 116 does not display a digital representation of the writing, at 204, because touch-input device 102 has not yet processed and rendered the digital representation of the writing. Physical layer 120, on the other hand, instantaneously display the letters "Joh" as the writing is received at 206. Note that because physical layer 120 overlays touchscreen display 116, that at 202 it appears to the user as though a digital representation of the writing is instantaneously displayed.

Continuing now to FIG. 2b, at 208, the user writes the letter "n" on touch-input device 102 using writing tool 118. Note that at 210, touchscreen display 116 now displays a digital representation of the letters "Joh". However, touchscreen display 116 does not yet display a digital representation of the letter "n" because touch-input device 102 has not yet processed and rendered the digital representation of the letter "n". Physical layer 120, on the other hand, instantaneously displays the letter "n" as the writing is received at 212. At this point, however, the letters "Joh" are deleted, or are in the process of decaying, from physical layer 120. Note that because physical layer 120 overlays touchscreen display 116, that at 208 it appears to the user as though a digital representation of the word "John" is instantaneously displayed.

Example Method

Figure 3:
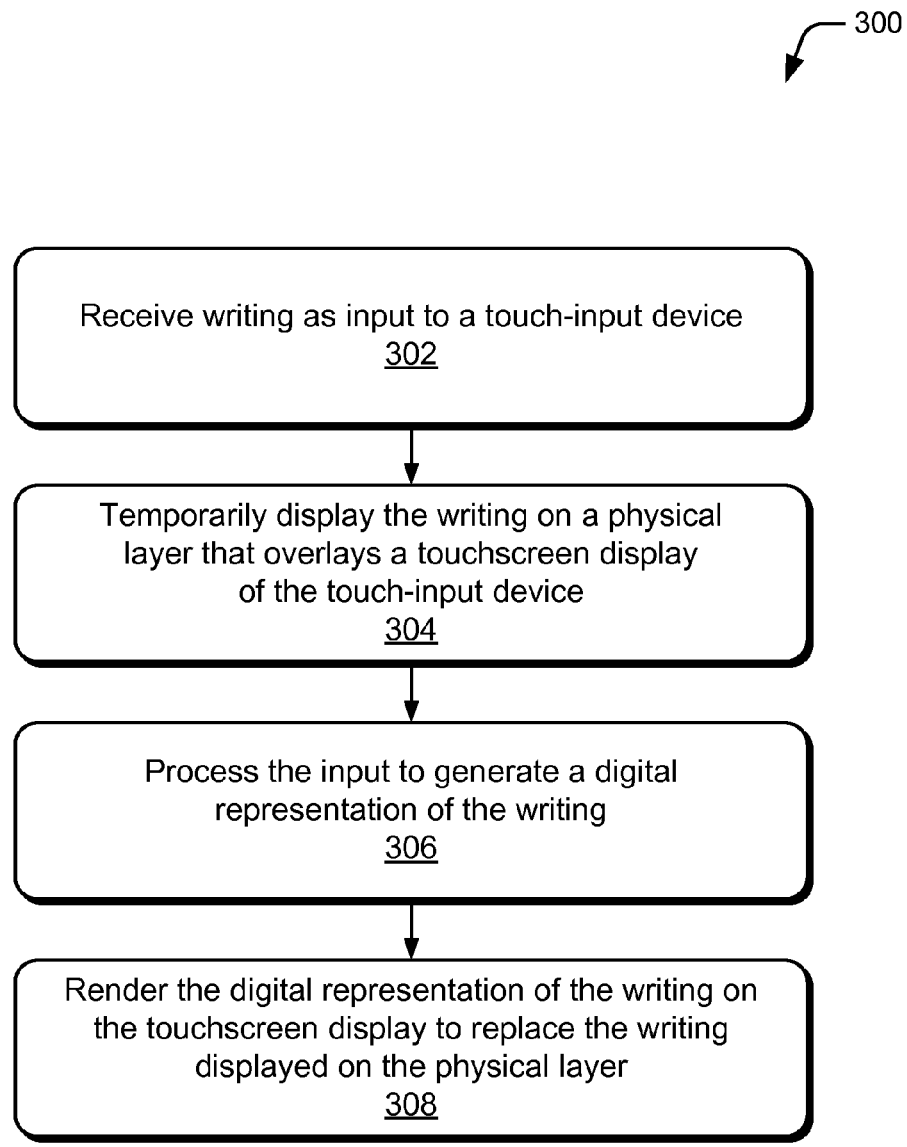
FIG. 3 illustrates an example method for controlling a low-latency touch-input device.

FIG. 3 is flow diagram depicting an example method 300 for controlling a low-latency touch-input device. Block 302 receives writing as input to a touch-input device. For example, touch-input device 102 (FIG. 1) receives writing as input when writing tool 118 contacts physical layer 120, which overlays touchscreen display 116.

Block 304 temporarily displays the writing on a physical layer that overlays a touchscreen display of the touch-input device. For example, physical layer 120, which overlays touchscreen display 116, temporarily displays the writing. Physical layer 120 may display the writing instantaneously before touch-input device processes the input.

Block 306 processes the input to generate a digital representation of the writing. For example, digitizer 112 processes the input to generate a digital representation of the writing. Block 308 renders the digital representation of the writing on the touchscreen display to replace the writing displayed on the physical layer. For example, controller 114 renders the digital representation of the writing on touchscreen display 116 to replace the writing displayed on physical layer 120.

Example Device

Figure 4:
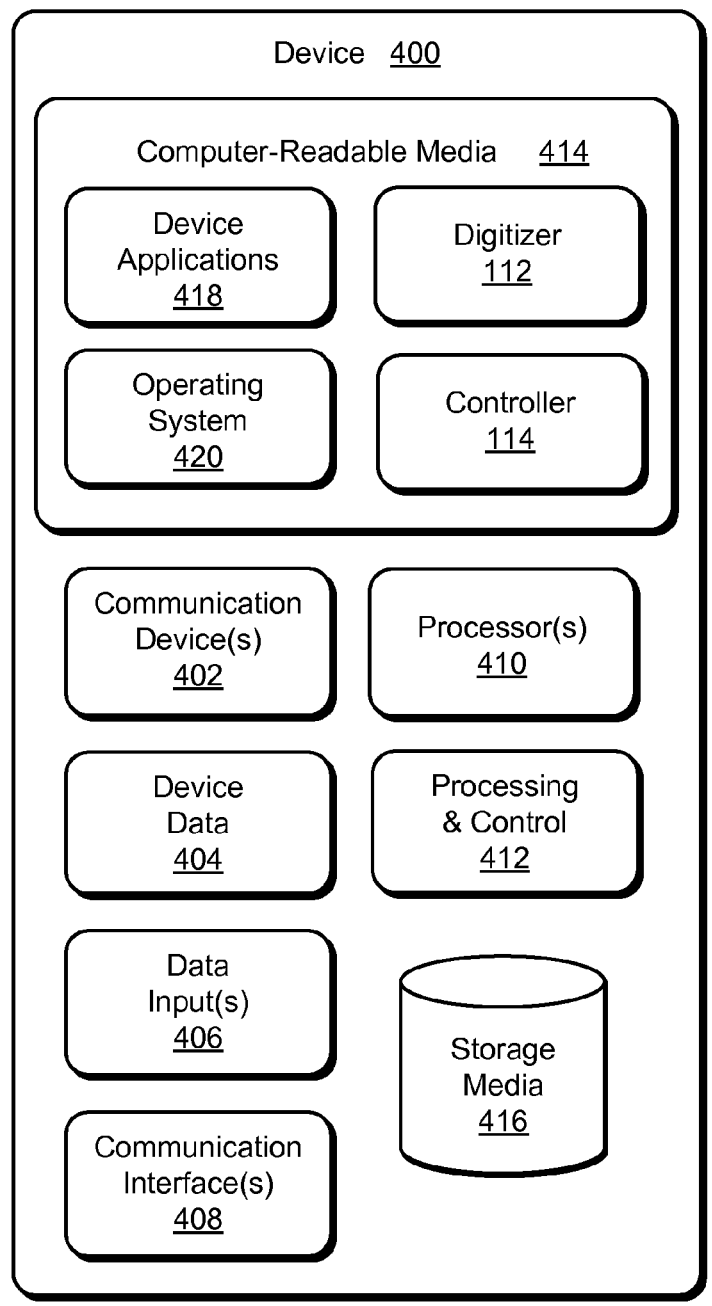
FIG. 4 illustrates an example device in which techniques for a low-latency touch-input device can be implemented.

FIG. 4 illustrates various components of example device 400 that can be implemented as any type of client, server, an on-chip system, and/or display device as described with reference to the previous FIGS. 1-3 to implement techniques enabling a low-latency touch-input device. In embodiments, device 400 can be implemented as one or a combination of a wired and/or wireless device, a head-mounted display device (e.g., eyeglasses, sunglasses, etc.) as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 400 may also be associated with a viewer (e.g., a person or user) and/or an entity that operates the device such that a device describes logical devices that include users, software, firmware, and/or a combination of devices.

Device 400 includes communication devices 402 that enable wired and/or wireless communication of device data 404 (e.g., received data, data that is being received, data scheduled for broadcast, data packets of the data, etc.). The device data 404 or other device content can include configuration settings of the device, media content stored on the device, and/or information associated with a user of the device. Media content stored on device 400 can include any type of audio, video, and/or image data. Device 400 includes one or more data inputs 406 via which any type of data, media content, and/or inputs can be received, such as user-selectable inputs, messages, music, television media content, recorded video content, and any other type of audio, video, and/or image data received from any content and/or data source.

Device 400 also includes communication interfaces 408, which can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices communicate data with device 400.

Device 400 includes one or more processors 410 (e.g., any of microprocessors, controllers, and the like), which process various computer-executable instructions to control the operation of device 400 and to enable techniques for implementing a low-latency touch-input device. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 also includes computer-readable storage media 414, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 400 can also include a mass storage media device 416.

Computer-readable storage media 414 provides data storage mechanisms to store the device data 404, as well as various device applications 418 and any other types of information and/or data related to operational aspects of device 400. For example, an operating system 400 can be maintained as a computer application with the computer-readable storage media 414 and executed on processors 410. The device applications 418 may include a device manager, such as any form of a control application, software application, signal-processing and control module, code that is native to a particular device, a hardware abstraction layer for a particular device, and so on.

The device applications 418 also include any system components or modules to implement techniques using or enabling a low-latency touch-input device. In this example, the device applications 418 can include a digitizer 112 and a controller 114 for controlling a low-latency touch-input device.

CONCLUSION

This document describes embodiments of a low-latency touch-input device. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A touch-input device comprising:
   a touchscreen display to receive writing as input to the touch-input device;
   a transparent physical layer overlaying the touchscreen display, the transparent physical layer configured to temporarily display the writing responsive to the writing being received and before processing the input to generate a digital representation of the writing on the touchscreen display;
   a digitizer to generate the digital representation of the writing for display on the touchscreen display responsive to processing the input and a location of the writing on the touchscreen display, the digital representation of the writing being generated to replace the writing that is temporarily displayed on the transparent physical layer; and
   a controller to:
     send the input to the digitizer to cause the digitizer to generate the digital representation of the writing;
     send the location of the writing on the touchscreen display to the digitizer for processing;
     before the writing is completely deleted from the transparent physical layer, render the digital representation of the writing on the touchscreen display, the controller configured to render the digital representation of the writing at a same location on the touchscreen display relative to the touch-input device as the writing it replaces on the transparent physical layer; and
     delete the writing from the transparent physical layer by refreshing the transparent physical layer at a constant time interval while the digital representation of the writing is rendered on the touchscreen display.

2. A touch-input device as described in claim 1, wherein the transparent physical layer is further configured to instantaneously display the writing before the digitizer generates the digital representation of the writing.

3. A touch-input device as described in claim 1, wherein the touch-input device is configured to receive the writing as input when a stylus, an electronic pen, a light pen, or a finger of a user contacts the touchscreen display.

4. A touch-input device as described in claim 1, wherein the controller is configured to delete the writing from the transparent physical layer by electronically refreshing the transparent physical layer.

5. A touch-input device as described in claim 1, wherein the transparent physical layer comprises a pressure-sensitive cholesteric liquid crystal layer that temporarily displays the writing when pressure from a writing tool is applied to the pressure-sensitive cholesteric liquid crystal layer.

6. A touch-input device as described in claim 1, wherein the transparent physical layer comprises a luminous layer that temporarily displays the writing when a writing tool containing a light source contacts the luminous layer.

7. A computer-implemented method comprising:
   receiving writing as input to a touch-input device, the touch-input device including a touchscreen display and a transparent physical layer that overlays the touchscreen display, locations on the touchscreen display corresponding to locations on the transparent physical layer, and the input to the touch-input device being received at same locations on the touchscreen display and the transparent physical layer;
   temporarily displaying the writing on the transparent physical layer that overlays the touchscreen display of the touch-input device;
   processing the input to generate a digital representation of the writing;
   determining an amount of time for the processing the input to generate the digital representation of the writing;
   determining an amount of time to render the digital representation of the writing on the touchscreen display;
   before the temporarily displayed writing is completely deleted from the physical layer, rendering the digital representation of the writing on the touchscreen display, the digital representation of the writing rendered on the touchscreen display visible through the physical layer; and
   deleting the temporarily displayed writing from the physical layer at a time interval that is based on the determined amount of time for the processing the input to generate the digital representation of the writing and further based on the determined amount of time to render the digital representation of the writing.

8. A computer-implemented method as described in claim 7, wherein writing is displayed instantaneously on the transparent physical layer before the touch-input device processes the input.

9. A computer-implemented method as described in claim 7, wherein the writing is received as input when a stylus, an electronic pen, a light pen, or a finger of a user contacts the touchscreen display.

10. A computer-implemented method as described in claim 7, wherein the deleting comprises causing the writing to fade from the transparent physical layer during the time interval.

11. A computer-implemented method as described in claim 7, wherein the transparent physical layer comprises a pressure-sensitive cholesteric liquid crystal layer that temporarily displays the writing when pressure from a writing tool is applied to the pressure-sensitive cholesteric liquid crystal layer.

12. A computer-implemented method as described in claim 7, wherein the transparent physical layer comprises a luminous layer that temporarily displays the writing when a writing tool containing a light source contacts the luminous layer.

13. A touch-input device comprising:
a touchscreen display configured to receive writing as an input;
a physical layer configured to:
receive the writing in response to a writing tool contacting the physical layer, the physical layer overlaying the touchscreen display and permitting the writing to be received as the input at the touchscreen display, the physical layer at least partially transparent and flexible; and
instantaneously display the writing in response to receiving the writing; and
delete a portion of the writing from display on the physical layer in response to a digital representation of the writing being generated for rendering on the touchscreen display and in response to a controller directing the physical layer to refresh, the digital representation of the writing being generated to replace the writing that is instantaneously displayed on the physical layer; and
a controller configured to:
determine a period of time to render the digital representation of the writing on the touchscreen display;
render the digital representation of the writing on the touchscreen display before the writing is completely deleted from the physical layer and at a same location on the touchscreen display relative to the touch-input device as the writing it replaces on the physical layer; and
refresh the physical layer to delete the portion of the writing from display on the physical layer based at least in part on the determined period of time to render the digital representation.

14. A touch-input device as described in claim 13, wherein to instantaneously display the writing comprises to display the writing less than 50 milliseconds after the writing is received or to display the writing before the digital representation of the writing is displayed on the touchscreen display.

15. A touch-input device as described in claim 13, wherein the physical layer comprises a pressure-sensitive cholesteric liquid crystal layer that displays the input when pressure from the writing tool is applied to the pressure-sensitive cholesteric liquid crystal layer.

16. A touch-input device as described in claim 13, wherein the physical layer comprises a luminous layer that displays the input when the writing tool, containing a light source, contacts the luminous layer.

17. A touch-input device as described in claim 13, wherein the touch screen display is a capacitive touchscreen display, a resistive touchscreen display, an infrared touchscreen display, or an optical touchscreen display.

18. A touch-input device as described in claim 13, wherein the physical layer is configured to delete the writing in response to a user action, the user action comprising one of stopping the writing for a period of time, completing the writing of a word, beginning the writing on a new line, or turning a page of an e-book on which the writing is received.

19. A computer-implemented method as described in claim 7, wherein the deleting the writing comprises deleting the writing from the physical layer in response to a user action, the user action comprising one of stopping the writing for a period of time, completing the writing of a word, beginning the writing on a new line, or turning a page of a book on which the writing is received.

20. A touch-input device as described in claim 13, the controller being further configured to determine a period of time to generate the digital representation of the writing on the touchscreen display, and wherein to refresh the physical layer is further based on the determined period of time to generate the digital representation of the writing on the touchscreen display.

* * * * *